United States Patent
Nerst et al.

(10) Patent No.: US 9,413,540 B2
(45) Date of Patent: Aug. 9, 2016

(54) COMBINING P2P AND SERVER-BASED CONFERENCING

(75) Inventors: Alex Nerst, Ashdod (IL); Avi Shechter, Ramot Hashavim (IL); Nimrod Sandlerman, Ramat-Gan (IL)

(73) Assignee: GENBAND US LLC, Frisco, TX (US)

(*) Notice: Subject to any disclaimer, the term of this patent is extended or adjusted under 35 U.S.C. 154(b) by 478 days.

(21) Appl. No.: 13/539,584

(22) Filed: Jul. 2, 2012

(65) Prior Publication Data
US 2013/0028115 A1    Jan. 31, 2013

Related U.S. Application Data

(60) Provisional application No. 61/504,617, filed on Jul. 5, 2011, provisional application No. 61/505,551, filed on Jul. 8, 2011.

(51) Int. Cl.
| | |
|---|---|
| H04L 12/26 | (2006.01) |
| H04L 12/18 | (2006.01) |
| H04L 12/24 | (2006.01) |

(52) U.S. Cl.
CPC ......... H04L 12/1827 (2013.01); H04L 12/1818 (2013.01); H04L 41/0893 (2013.01); H04L 43/087 (2013.01); H04L 43/0841 (2013.01); H04L 43/0847 (2013.01); H04L 43/0864 (2013.01)

(58) Field of Classification Search
CPC ... H04W 24/00; H04L 43/50; H04L 43/0852; H04L 43/08; H04B 17/003
USPC .................................. 370/252, 254, 255, 248
See application file for complete search history.

(56) References Cited

U.S. PATENT DOCUMENTS

| | | | |
|---|---|---|---|
| 5,870,146 A * | 2/1999 | Zhu | H04N 19/176 375/240 |
| 7,016,673 B2 | 3/2006 | Reddy et al. | |
| 7,206,332 B2 * | 4/2007 | Kwan | H04L 1/0003 370/441 |
| 2002/0091833 A1 | 7/2002 | Grimm et al. | |
| 2002/0119821 A1 | 8/2002 | Sen et al. | |
| 2004/0133631 A1 | 7/2004 | Hagen et al. | |
| 2006/0239275 A1 * | 10/2006 | Zlateff | H04L 29/12009 370/400 |
| 2006/0281462 A1 * | 12/2006 | Kim | H04W 36/30 455/436 |
| 2007/0058626 A1 | 3/2007 | Keller | |
| 2007/0117570 A1 * | 5/2007 | Noh et al. | 455/452.2 |

(Continued)

FOREIGN PATENT DOCUMENTS

WO    WO2008051974    5/2008

*Primary Examiner* — Hassan Phillips
*Assistant Examiner* — Siren Wei
(74) *Attorney, Agent, or Firm* — Haynes and Boone, LLP (57) ABSTRACT

A system and a method for teleconferencing including a plurality of terminals, a plurality of peer servers and at least one conferencing servers, where the terminals measure their channel quality, create at least one group of terminals according to their channel quality measurements, and using a coding scheme adaptive to the channel quality measurements. The terminals communicate conferencing content via peer-to-peer communication, directly between terminals who are members of the group of terminals, and using the selected coding scheme, and communicate the same conferencing content with other terminals participating in the conferencing call via at least one network device such as a conferencing-server and a peer-server. Where the conferencing-server and/or the peer-server provide conversion for the conferencing content, adaptive to the other terminals.

19 Claims, 4 Drawing Sheets

(56) References Cited

U.S. PATENT DOCUMENTS

| | | | |
|---|---|---|---|
| 2007/0117579 A1* | 5/2007 | Cai | H04W 72/005 455/509 |
| 2007/0258540 A1* | 11/2007 | Ratasuk | H04J 11/005 375/267 |
| 2008/0133535 A1 | 6/2008 | Fischer | |
| 2008/0232301 A1* | 9/2008 | Cai | H04L 1/0003 370/328 |
| 2009/0016232 A1* | 1/2009 | Kwon | H04W 76/023 370/252 |
| 2010/0287238 A1* | 11/2010 | Setton et al. | 709/204 |
| 2011/0038266 A1* | 2/2011 | Kim | H04W 72/042 370/242 |

\* cited by examiner

COMBINING P2P AND SERVER-BASED CONFERENCING

CROSS-REFERENCE TO RELATED APPLICATIONS

This application claims the benefit of priority of U.S. Provisional Patent Application No. 61/504,617, filed Jul. 5, 2011, and U.S. Provisional Patent Application No. 61/505,551, filed Jul. 8, 2011, the disclosures of which are incorporated herein by reference in their entirety.

FIELD OF THE INVENTION

The present invention relates to teleconferencing, including video-teleconferencing or multimedia conferencing, and more particularly but not exclusively, to systems and methods for teleconferencing optimization.

BACKGROUND OF THE INVENTION

Teleconferencing and video-teleconferencing are known in the art. The common conferencing topology includes a plurality of terminals communicating via a hub. The hub receives the streaming content from all the terminals participating in the conference, mixes the content and sends the mixed content to each of the terminals. In many situations the server sends a different mix to different terminals. The need to communicate via the hub creates a delay, also known as latency.

A second, relatively newer, conferencing topology uses peer-to-peer networking. In this topology there is no hub, and each terminal sends its content stream to each terminal. Thus, there is no latency; however, each terminal may need to create a different stream according to the needs and limitations of each receiving terminal.

In a third conferencing topology the terminals connect to the peer-to-peer network via terminal proxy servers. The terminals transmit their content streams to their respective proxies. The proxies are connected as peers in the peer-to-peer network and exchange the content streams. The proxies receive content streams, create the content mixes and transmit them to their respective terminals. Thus the processing and the communication bandwidth requirements on the terminals are much smaller. Such topology is advantageous with mobile terminals where, power, processing power and bandwidth are relatively limited.

Hence, each of the conferencing topologies has its advantages and disadvantages. U.S. Pat. No. 7,016,673, US patent applications 20020091833, 20020119821, 20040133631, 20070058626, and 20080133535, and PCT application WO2008051974 are believed to represent the state of the art.

There is thus a widely recognized need for a mechanism for optimizing the conferencing mechanism, and it would be highly advantageous to have, a conferencing method and system devoid of the above limitations.

SUMMARY OF THE INVENTION

According to one aspect of the present invention there is provided a method for teleconferencing, the method including steps of: measuring channel quality for a plurality of terminals participating in the teleconferencing, creating at least one group of terminals, from the plurality of terminals measuring channel quality, according to the channel quality measurements, selecting a coding scheme adaptive to the channel quality measurements, communicating conferencing content directly between the group of terminals via peer-to-peer communication and using the selected coding scheme, and communicating conferencing content with other terminals participating in the conferencing call via at least one network device selected from a group consisting of: a conferencing-server and a peer-server.

According to another aspect of the present invention there is provided the method for teleconferencing where at the conferencing-server and/or the peer-server provides conversion for the conferencing content adaptive to the other terminals.

According to still another aspect of the present invention there is provided the method for teleconferencing where the channel quality measurement includes measuring at least one communication parameter such as: available bandwidth, error rate, BER (bit error rate), packet error rate, packet loss, latency, packet latency, initial delay (delay to first returned packet), inter-packet delay (average delay between packets), maximum packet delay, median packet delay, packet delay for N standard deviations, quality of service, signal to noise ratio, interference, and multipath.

According to one aspect of the present invention there is provided a method for participating in a teleconferencing call, the method including steps of: interrogating for a group of terminals participating in the conferencing call and using a common coding scheme, communicating conferencing content directly with at least one terminal of the group of terminals via direct peer-to-peer communication and using the coding scheme, and communicating conferencing content with other terminals participating in the conferencing call via at least one network device selected from a group consisting of: a conferencing-server and a peer-server.

According to another aspect of the present invention there is provided the method for participating in a teleconferencing call where the conferencing-server and/or the peer-server provides conversion for the conferencing content adaptive to the other terminals.

According to another aspect of the present invention there is provided a method for a teleconferencing call, the method including steps of: interrogating for terminals participating in the conferencing for at least one parameter of each of the terminals the parameter selected from a group consisting of: channel quality and coding scheme, managing a database of the terminal parameters, managing a database of the terminals using at least one coding scheme, informing terminals of the at least one entity selected from a group consisting of terminals and groups of terminals adaptive to at least one communication parameter selected from a group consisting of same channel quality and same coding scheme.

According to still another aspect of the present invention there is provided the method for teleconferencing where the channel quality measurement includes measuring at least one communication parameter such as: available bandwidth, error rate, BER (bit error rate), packet error rate, packet loss, latency, packet latency, initial delay (delay to first returned packet), inter-packet delay (average delay between packets), maximum packet delay, median packet delay, packet delay for N standard deviations, quality of service, signal to noise ratio, interference, and multipath.

According to another aspect of the present invention there is provided a network device including: a communication module operative to enable the network device to communicate in a communication network, a peer communication module operative to enable the network device to participate as a peer in a peer-to-peer network, the a peer-to-peer network operating in the communication network, a module for measuring channel quality of the network device in the communication network, a module for selecting at least one coding scheme adaptive to the channel quality, a module for interrogating for a group of terminals participating in a conferencing call and using a common coding scheme compatible with at least one of the selected at least one coding scheme, a module for participating in a conference call, concurrently using at least two conferencing technologies such as: conferencing-server-based conferencing, peer-server based conferencing and peer-to-peer conferencing.

According to still another aspect of the present invention there is provided the network device where the module for participating in a conference call is operative to: communicate conferencing content directly with the group of terminals using common coding scheme via peer-to-peer conferencing using the selected coding scheme, and communicate conferencing content with other terminals participating in the conferencing call using one or more other conferencing technology.

According to yet another aspect of the present invention there is provided the network device where the communicating conferencing content with the other terminals participating in the conferencing call includes communicating the conferencing content via one or more network devices such as a conferencing-server and a peer-server.

Further according to another aspect of the present invention there is provided the network device where at least one of the conferencing-server and the peer-server provides conversion for the conferencing content adaptive to the other terminals.

Still further according to another aspect of the present invention there is provided the network device where the measuring channel quality includes measuring at least one communication parameter such as: available bandwidth, error rate, BER (bit error rate), packet error rate, packet loss, latency, packet latency, initial delay (delay to first returned packet), inter-packet delay (average delay between packets), maximum packet delay, median packet delay, packet delay for N standard deviations, quality of service, signal to noise ratio, interference, and multipath.

Even further according to another aspect of the present invention there is provided a computer program product including instructions operative to cause a programmable processor of a network device to perform any of the methods described above.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE INVENTION

The principles and operation of a conferencing method and system according to the present invention, may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text has the same use and description as in the previous drawings where it was described.

Teleconferencing is well known in the art. In this respect, the term conferencing or tele-conferencing preferably includes audio-conferencing, voice-conferencing or telephone-conferencing, video-teleconferencing or videoconferencing, multimedia conferencing, etc. The conferencing system therefore enables a plurality of users to exchange in real time conferencing content including text, sound, images, video, multimedia, etc. The term conferencing content may also refer to conferencing media, conferencing information, content stream, etc., interchangeably The common conferencing topology includes a plurality of terminals communicating via a hub where the hub receives the streaming content from all the terminals participating in the conference and distribute it. The term conferencing topology may also be understood as conferencing technology, or conferencing access method or conferencing access mode. The hub may also be known as a conferencing switch, a conferencing server, a conferencing bridge, a conferencing relay, a conferencing gateway, a multimedia conferencing server, etc. This conferencing topology or technology may be called herein "server-based conferencing".

The hub is therefore responsible to mixing the content and sending a video stream to each of the terminals according to the requirement of the terminals. Such requirements include the choice of terminals which content should be received, the format, and the available bandwidth. Format includes resolution, display form-factor, compression mechanism, etc. The hub is therefore responsible to all transcoding requirements.

Transcoding and/or conversion here refer to any aspect of translating between different resolutions, display form-factors, compression mechanisms, etc. as transmitted and received by the various terminals. The term coding scheme refers to a particular combination of such attributes and/or features that may require transcoding or conversion. The term common coding scheme refers to a group of terminals using the same coding scheme so that transcoding or conversion is not needed or at least kept to a minimum. Preferably, this minimum is predefined.

In peer-to-peer conferencing topology there is no hub. The terminals are connected as peers in a peer-to-peer (p2p) network and each terminal sends its content stream to each other terminal. Thus the terminals should take care of the transcoding and mixing of the content, whether when sending content or when receiving content.

In proxy p2p conferencing topology the terminals are connected to the peer-to-peer network via terminal proxy servers (proxies). The terminals transmit their content streams to their respective proxies. The proxies are connected as peers in the peer-to-peer network, representing their respective terminals. It is appreciated that each terminal may have its own proxy, or alternatively, a proxy may serve two or more terminals. The proxies exchange the content streams, create the content mixes and transmit them to their respective terminals. Thus the processing load for transcoding and mixing as well as the communication bandwidth requirements are moved to the proxies. Such topology is advantageous with mobile terminals where, power, processing power and bandwidth are relatively limited. This conferencing topology or technology may be also named below "peer-server conferencing".

Preferably, the proxy servers of the proxy p2p conferencing topology represent their respective terminals in the p2p network. This representation preferably means that a proxy appears in the p2p network as the terminal it represents. Preferably, the proxy server appears in the p2p network using the peer identification of the represented terminal. Likewise, other terminals or proxy servers addressing the represented terminal use the peer identification of the represented terminal to send their content to the proxy representing that terminal. In this respect, a proxy server representing several terminals may appear in the p2p network using several peer identifications, each associated with a represented terminal.

The purpose of the present invention is to enable terminals to migrate between conferencing topologies, and/or to combine conferencing topologies, and thus to optimize the conferencing and improve the user's experience. This technology of combining conferencing technologies or topologies and migrating between such is termed herein "combined-access teleconferencing".

Figure 1:
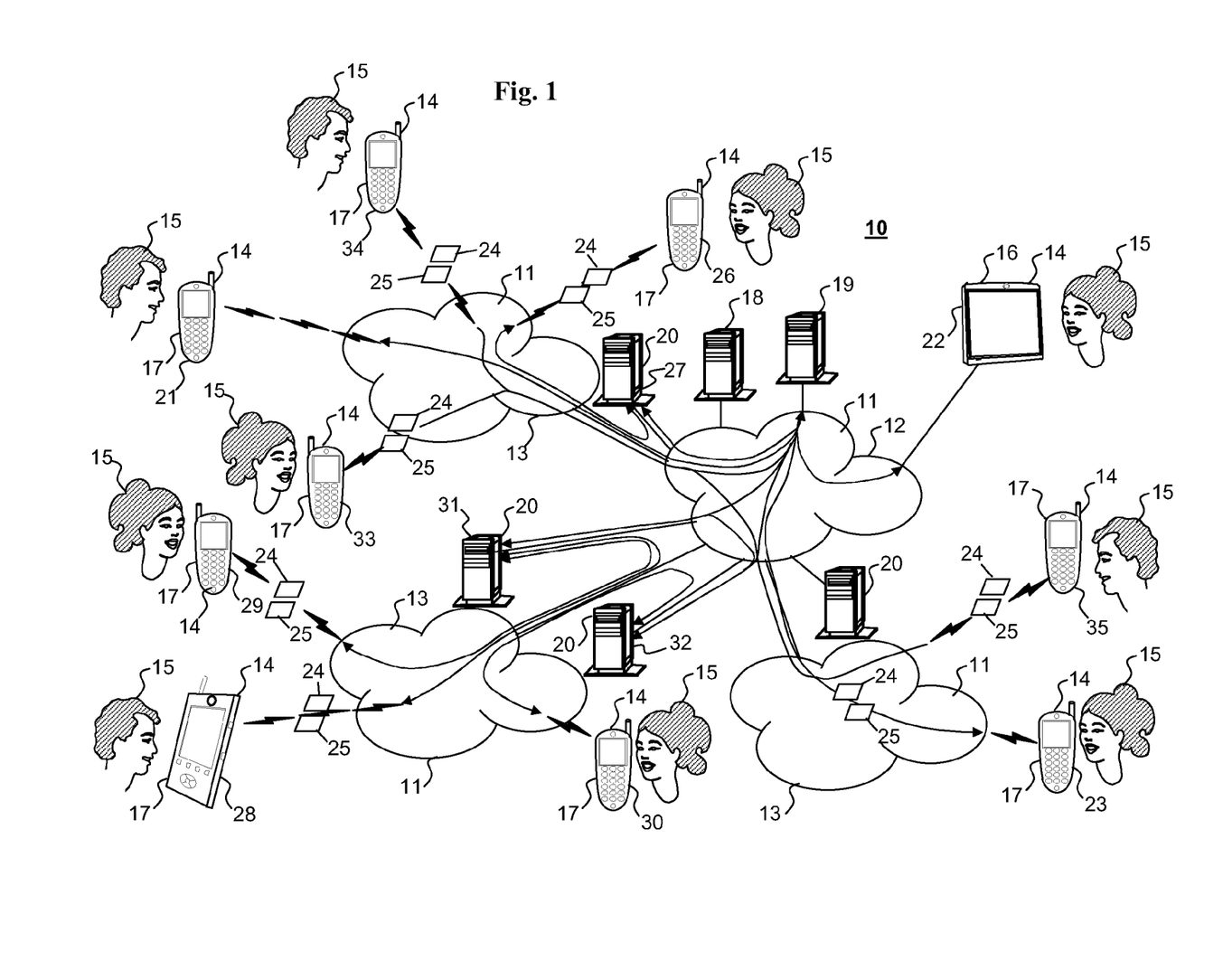
FIG. 1 is a simplified illustration of a combined-access teleconferencing-network.

Reference is now made to FIG. 1, which is a simplified illustration of a combined-access teleconferencing-network 10 according to a preferred embodiment of the present invention.

As shown in FIG. 1, the combined-access teleconferencing-network 10 preferably contains several communication networks 11. It is appreciated that the combined-access teleconferencing-network 10 can be based on a single communication network. However, for the sake of a more comprehensive explanation, several networks are shown. Preferably, communication network 11 designated with the numeral 12 is a fixed, preferably wideband, communication network, or any other type of network having a relatively high bandwidth communication channels. Optionally, the communication network 11 designated with the numeral 13 are mobile networks, or any other type of network having a relatively lower bandwidth, or varied bandwidths (different terminals having different bandwidths), or a varying bandwidth (where the bandwidth may change with time, location, motion, interference, etc.). FIG. 1 shows that all mobile networks 13 are connected via the fixed network 12, however, it is appreciated that mobile networks 13 may be connected between themselves, and that the fixed network 12 may include a plurality of networks.

The combined-access teleconferencing-network 10 additionally and preferably contains a plurality of terminals 14 used by users 15. The users 15 and their terminals 14 are participating in a conference call. Terminals 14 are network devices that may be connected to the fixed network 12, such as terminal 14 that is designated by numeral 16 and/or to the mobile networks 13, such as terminals 14 designated by numeral 17. Terminals 14 may be computers, laptop computers, palmtop computers, tablet computers, cellular telephone or similar mobile terminals, video-game terminals or any other type of terminal that can be connected to a communication network.

The combined-access teleconferencing-network 10 additionally and preferably contains a peer-to-peer (p2p) network managed by a p2p server 18 and a conferencing server 19. Terminals 14 are preferably peers in the p2p network. The conferencing server 19 is a network device and may be also named a hub, a conferencing switch, a conferencing server, a conferencing bridge, a conferencing relay, a conferencing gateway, a multimedia conferencing server, etc. The conferencing server 19 is also, preferably, a peer device in the p2p network. Thus, the combined-access teleconferencing-network 10 is practically a peer-to-peer network. It is appreciated that the combined-access teleconferencing-network 10 may include more than one conferencing server 19.

The combined-access teleconferencing-network 10 additionally and preferably contains a plurality of peer servers 20. The peer servers 20 are network devices and may also be named proxies, or proxy-servers. Some of the terminals 14 delegate at least some of their peer operations to their respective proxies 20 and thus the proxies 20 can represent their respective terminals 14 in the p2p network by performing peer operations on behalf of their respective terminals 14. Preferably, the proxies 20 are connected to the fixed network 12 and also communicate with their respective terminals 14 via the respective mobile networks 13.

As shown in FIG. 1, the combined-access teleconferencing-network 10 enables terminals 14 to participate in the conferencing call (or conferencing session) preferably in a number of mechanisms, or conferencing topologies.

Terminals 14 may communicate directly with (or rather directly via) the conferencing server 19 (server-based conferencing topology). As shown in FIG. 1, terminals 14 designated by numerals 21, 22 and 23 communicate directly via the conferencing server 19 using server-based conferencing topology. Each terminal sends content stream 24 and receives content stream 25.

The conferencing server 19 preferably receives the streaming content 24 from such terminals 14, mixes the content, and distributes the mixed content 25 to these terminals 14. It is appreciated that the content 24 and/or 25 is preferably streaming content, such as voice and video, however, the content 24 and/or 25 may also be any other type of content such as text and still images.

The conferencing server 19 preferably creates a different mix of content according to the requirement of each of the terminals 14. For example, the user 15 of a terminal 14 may select to receive content from only some of the other terminals 14 participating in the conference. Thus, the conferencing server 19 creates and sends to this terminal a special mix containing content received from those selected terminals only. Similarly, the user 15 of a terminal 14 may select a particular display format. Thus, the conferencing server 19 creates and sends to this terminal a content stream compatible with the selected display format. Additionally, each terminal may have a different type of camera and a different type of screen, having different resolution, different form-factor (or aspect ratio), and different number of pixels. The conferencing server 19 therefore adapts the content stream to the characteristics of the receiving terminal. This may need conversion of content received from other terminals. Conversion here means the translating of features such as resolution, form factor, pixel number, etc. Since different terminals may also use different compression schemes the conferencing server 19 may also need to perform transcoding (conversion) between the various compression schemes. For simplicity, the terms conversion and transcoding may be used interchangeably. Therefore, the particular content stream mix reflects all or part of the aspects, characteristics and requirement of a particular terminal, as listed and described above.

Terminal 14 designated by numeral 26 joins the conferencing call preferably via its peer server 20 designated by numeral 27. Thus, Conferencing server 19 receives the content streams 24 from terminals 21, 22, 23 and 26, and sends the various mixed content streams 25 to the terminals 21, 22, and 23 and to terminal 26 via its peer server 27.

Preferably, as the bandwidth provided by the communication network 13 to terminal 26 may change, peer server 27 preferably adapts the characteristics of the content stream sent to terminal 26 to the bandwidth limitations. Similarly, peer server 27 may also adapt to bandwidth changes affecting the content stream received from terminal 26, as well as changes in the bandwidth between peer server 27 and conferencing server 19. Thus, peer server 27 relieves at least some of the processing power requirements on the conferencing server 19 and hence supports scalability. However, peer server 27 may increase the latency (delay) for the content streams from and to terminal 26.

Terminals 14 designated by numerals 28, 29 and 30 join the conferencing call preferably via their respective peer servers 20 designated by numerals 31 and 32 (Peer server 31 serving both terminals 28 and 29). It is appreciated that terminals 28, 29 and 30 may have been using different communication networks 11. Terminals 28, 29 and 30 are preferably peers in the combined-access teleconferencing-network 10. However, terminals 28, 29 and 30 preferably delegated at least some of their peer functions and/or operations to peer servers 31 and 32 such that peer servers 31 and 32 perform peer operations on behalf of terminals 28, 29 and 30.

In this respect, peer servers 31 and 32 preferably exchange the content streams of terminals 28, 29 and 30 directly between themselves (rather than via the conferencing server 19). Hence, Peer servers 31 and 32 receive the content streams of terminals 28, 29 and 30, create the appropriate mix for each of terminals 28, 29 and 30 and send the mixed stream to the respective terminal (peer-server conferencing topology).

Peer servers 31 and 32 also send the content streams received from terminals 28, 29 and 30 to the conferencing server 19, so that the conferencing server 19 can add these content streams to the mixes sent to terminals 21, 22, 23 and 26.

Accordingly, peer servers 31 and 32 additionally receive from the conferencing server 19 the content streams it receives from terminals 21, 22, 23 and 26. Peer servers 31 and 32 add the content streams of terminals 21, 22, 23 and 26 to the content stream mixes sent to terminals 28, 29 and 30.

It is appreciated that if sufficient bandwidth is available for the peer servers (e.g. peer servers 31 and 32) the peer-server conferencing topology has better scalability over conferencing server topology.

Terminals 14 designated by numerals 33, 34 and 35 join the conferencing call preferably by communicating content streams directly between themselves using peer conferencing topology (or peer-to-peer conferencing topology). Terminals 33, 34 and 35 are preferably peers in the combined-access teleconferencing-network 10. This means that terminal 33 sends its content stream to each of terminals 34 and 35, and receives content streams from each of terminals 34 and 35. The same applies to terminal 34 with respect to terminals 33 and 35, and to terminal 35 with respect to terminals 33 and 34. Terminals 33, 34 and 35 are therefore each responsible to create their own content mix. This peer conferencing topology reduces the latency to a minimum, however, increases the processing power and bandwidth requirements on the terminals 33, 34 and 35.

Preferably, terminals 33, 34 and 35 use a common coding scheme. This means that terminals 33, 34 and 35 use same or similar communication attributes. For example, terminals 33, 34 and 35 have use the same communication bit-rate, and/or the same compression scheme, and/or any other attribute such as resolution, form factor, pixel number, etc. Using a common coding scheme relives terminals 33, 34 and 35 from the need to transcode or convert each other's content stream.

It is appreciated that a common coding scheme may include identical attributes or even similar attributes. Similar attributes mean that transcoding or conversion may be needed but the processing power requirements are low enough to be affordable by the terminals.

Preferably, terminals 33, 34 and 35 also send their content streams to the conferencing server 19 to be included in the content mix streams sent to terminals 21, 22, 23 and 26. Terminals 33, 34 and 35 also receive from conferencing server 19 content streams of terminals 21, 22, 23 and 26. Additionally, terminals 33, 34 and 35 exchange content streams with peer servers 31 and 32 on behalf of terminals 33, 34 and 35. Terminals 33, 34, 35 may with peer servers 31, 32 exchange content streams either directly or via conferencing server 19.

Therefore, as shown in FIG. 1, terminals 14 preferably participate in the conferencing using combines access and the combined-access teleconferencing-network 10 preferably provides terminals 14 with combined access to its conferencing service. Combined access means that a terminal 14 may access the conference call, or teleconferencing-network 10, in any, or at least some, of the access mode enabled by the various conferencing topologies as described above. Such access modes may therefore be:

Communicating conference content via a conferencing server (server-based conferencing). The server may then communicate the conferencing content either directly with the other terminals or via one or more peer servers (proxies) representing terminals.

Communicating conference content via a peer server and a conferencing server. The server may then communicate the conferencing content either directly with the other terminals or via one or more peer servers (proxies) representing terminals (server-based peer-server conferencing).

Communicating conference content via a peer server, either directly to other terminals or via one or more peer servers (proxies) representing terminals (peer-server conferencing).

Communicating conference content directly with other terminals (peer-to-peer conferencing).

Furthermore, terminal 14 may access the conference call, or teleconferencing-network 10, in a combination of two or more access modes (or conferencing topologies, or conferencing technologies). Thus, combined access enables terminal 14 to use two or more access modes concurrently.

Even further, the combined-access teleconferencing-network 10 preferably enables terminals 14 to migrate between conferencing topologies. Migration here means changing the access method or changing the combination of access methods. Therefore, terminals 14 are able to migrate between conferencing topologies and to adapt their particular combination of access methods to changes in the communication environment and particularly to changes of communication bandwidth. Preferably, such migration and/or adaptation are performed automatically.

It is appreciated that peer servers 31 and 32 may also use common coding scheme to reduce processing power requirements or the determine whether to exchange conferencing content between themselves or via the conference server 19.

Figure 2:
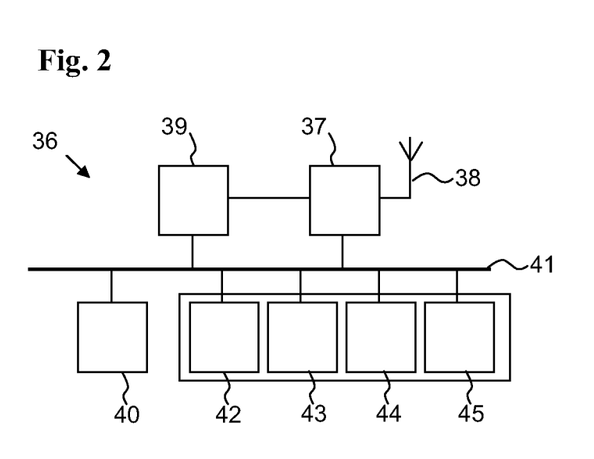
FIG. 2 is a simplified block diagram of a terminal of the combined-access teleconferencing-network.

Reference is now made to FIG. 2, which is a simplified block diagram 36 of terminal 14 of combined-access teleconferencing-network 10 according to a preferred embodiment of the present invention.

As shown in FIG. 2, terminal 14 is a network device preferably including the following components:

A communication module 37 enabling terminal 14 to communicate in communication network 11 or any other type of communication network. The communication module 37 preferably includes a communication interface to the communication network 11, such as antenna 38.

A user interface module 39 preferably connected to communication module 37, preferably including user interface peripherals such as a microphone, a speaker, an earpiece, a display, a keyboard, a pointing device, etc.

A processor 40 and at least one memory module 41 preferably hosting software program modules and data for the processor 40.

A peer communication module enabling terminal 14 to communicate as a peer device in a peer-to-peer network such as combined-access teleconferencing-network 10 preferably operating over the communication network 11 (and optionally over other networks as well).

A module 42 for measuring communication channel quality of terminal 14 in communication network 11. Measuring channel quality refers to measuring one or more communication parameters such as: available bandwidth, error rate, BER (bit error rate), packet error rate, packet loss, latency, packet latency, initial delay (delay to first returned packet), inter-packet delay (average delay between packets), maximum packet delay, median packet delay, packet delay for N standard deviations, quality of service, signal to noise ratio, interference, multipath, etc., or any other parameter that may affect the effective bit-rate available to terminal 14. Channel quality may also be termed channel performance or transmission performance A module 43 for selecting at least one coding scheme adaptive to the measured channel quality.

A module 44 for participating in a conference call over the combined-access teleconferencing-network 10.

A module 45 for interrogating other terminals 14 participating in the conference call, searching for a group of terminals 14 using a common coding scheme compatible with a coding scheme selected by module 43.

It is appreciated that modules 42, 43, 44, and 45 are preferably software modules contained in memory 41. Alternatively, any of modules 42, 43, 44, and 45 may be implemented as a hardware module.

Using modules 42, 43, 44, and 45 as well as communication module 37, communication interface 38 and user interface 39, the processor 40 can manage terminal 14 so that terminal 14 can establish and/or join a conferencing call, select an access mode (or conferencing topology, or conferencing technology), migrate between access modes or conferencing topologies, and/or access the conferencing call using a combination of access modes.

When accessing a conferencing call using a combination of access modes, terminal 14 uses at least two conferencing technologies concurrently. Such conferencing technologies may be: server-based conferencing, peer-server based conferencing, peer-to-peer conferencing, server-based peer-server conferencing, etc.

Particularly, Module 44 enables terminal 14 to communicate conferencing content directly with a group of terminals using a common coding scheme via peer-to-peer conferencing (using the common coding scheme), and to communicate conferencing content with other terminals participating in the conferencing call using one or more other conferencing technologies, such as conferencing-server-based conferencing, peer-server based conferencing, server-based peer-server conferencing, etc.

Preferably, the access mode or the combination of access modes is selected according to the channel quality as measured by module 42. Preferably, module 43 is used to select one or more coding schemes adaptive to the measured channel quality. Accordingly, module 45 is used to interrogate other terminals participating in the conference call to find a group of terminals that use a common coding scheme. If such a group is found, terminal 14 preferably joins this group. Joining a group of terminals using a common coding scheme preferably means that terminal 14 exchange conferencing content with other terminals in that group directly, preferably using peer-to-peer conferencing. Terminal 14 may preferably communicate conferencing content with other terminals participating in the conferencing call (and not participating in the group) using one or more other conferencing technology, such as conferencing-server-based conferencing, peer-server based conferencing.

If such a group does not exist, but a plurality of terminals 14 participating in the conference call do use the same coding scheme, a terminal 14 may establish such group of terminals using a common coding scheme.

Similarly, if such a group does not exist, but a plurality of terminals 14 participating in the conference call may use the same coding scheme, a terminal 14 may establish a group of terminals using a common coding scheme.

Figure 3:
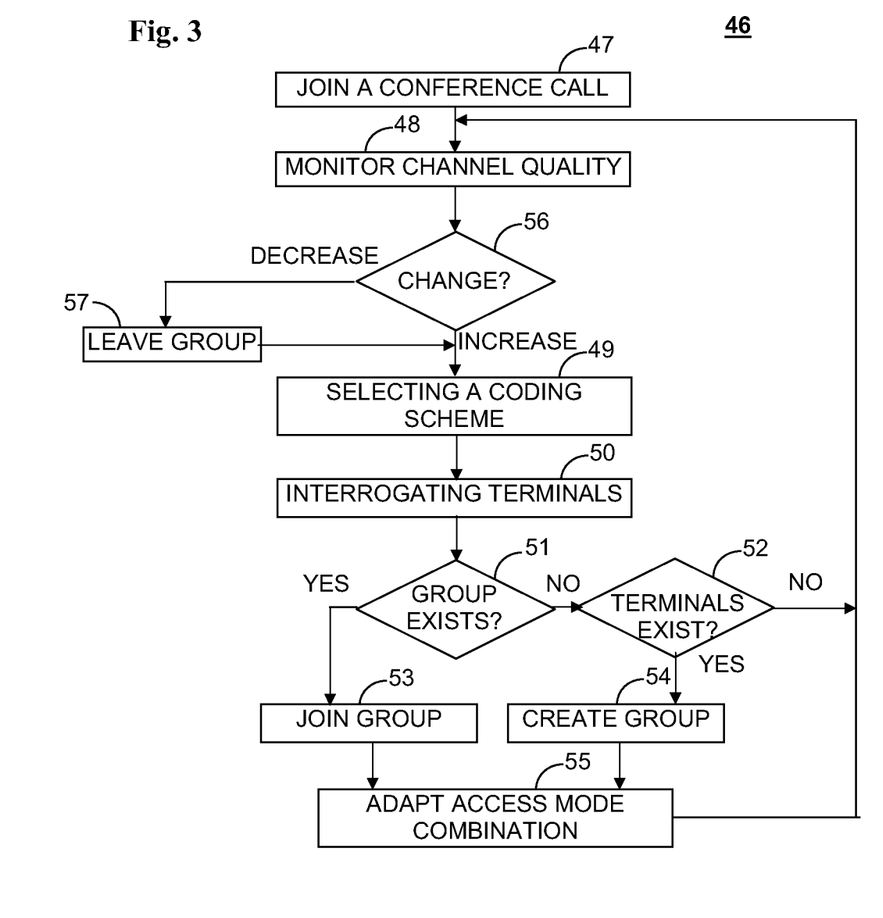
FIG. 3 is a simplified flow diagram of a software program controlling the terminal of the combined-access teleconferencing-network.

Reference is now made to FIG. 3, which is a simplified flow diagram of a software program 46 stored in memory 41 and executed by processor 40 to control terminal 14 according to a preferred embodiment of the present invention.

As shown in FIG. 3, software program 46 includes the following steps, preferably executed in a loop, automatically and/or continuously, while terminal 14 is participating in a conference call.

Starting with step 47, terminal 14, using processor 40 and software program 46, preferably uses module 44 to join or establish a conference call. Terminal 14 may join or establish the conference call using any available conferencing technology, however, preferably, the default conferencing technology is using a conferencing server 19.

Proceeding to step 48, terminal 14, using processor 40 and software program 46, preferably uses module 42 to monitor its communication channel quality. Such monitoring is preferably performed by continuously and/or repeatedly measuring one or more communication parameters such as: available bandwidth, error rate, packet loss, packet latency, signal to noise ratio, interference, multipath, etc., or any other parameter that may affect the effective bit-rate available to terminal 14. It is appreciated that module 42 may continue to monitor the channel quality while software program 46 proceeds.

Proceeding to step 49, preferably using the channel quality measured by module 42, terminal 14 using processor 40, software program 46 and module 43 selects one or more coding scheme which is appropriate for use with the measured channel quality.

Proceeding to step 50, preferably using coding schemes measured by module 43, terminal 14 using processor 40, software program 46 and module 45 interrogates one or more terminals 14 participating in the conference call. The interrogation may include direct communication with all or some of the terminals 14. Alternatively, the interrogation may include communication with mediating server, such as p2p server 18.

The interrogation seeks a group of terminals 14 communicating in a peer-to-peer conferencing topology using a common coding scheme that is compatible with at least one of the coding schemes selected in step 49. In this case, if such a group is found, the interrogating terminal 14 may join the group. It is appreciated that the interrogating terminal 14 may request permission from the terminals 14 of the group of terminals to exchange conferencing content with each of these terminals 14. Such permission may also be granted by the mediating server. The permission is required for example one or more terminal 14 of the group may already reach its bandwidth capacity.

Alternatively, the interrogation seeks one or more terminals 14 that are able to communicate in a peer-to-peer conferencing topology using at least one of the coding schemes selected in step 49. In this case, if such terminals 14 are found, the interrogating terminal 14 may establish such group.

Terminal 14, using processor 40 and software program 46, preferably proceeds to step 51 and optionally also to step 52, and according to their results proceeds to steps 53 or 54 to join the group or to create a group or to continue searching.

Terminal 14, using processor 40, software program 46, preferably proceeds to step 55, and using module and module 44 adapts the access mode to the conference call accordingly. Such adaptation includes using peer-conferencing technology to communicate conferencing content via peer-to-peer communication and using a selected coding scheme as a common coding scheme, directly with terminals 14 of the group of terminals found or created previously. Additionally or optionally, the adaptation includes communicating conferencing content with other terminals participating in the conferencing call via at least one other access mode, such as:

Using a conferencing-server 19 providing conversion for the conferencing content adaptive to other terminals.

Using one or more peer-servers 20 providing conversion for the conferencing content adaptive to other terminals.

Such combined access mode preferably uses two or more access mode types concurrently.

The process described above preferably applies to a terminal just joining a conference call, or to a situation such as when there is an improvement in the channel quality. However, a decrease of channel quality is also possible, and in such situation the channel quality may be insufficient for the common coding scheme. In such situation a terminal already participating in a group using a particular coding scheme may have to leave the group and seek another group as described by steps 56 and 57.

Steps 48 to 57 are preferably executed in a continuous loop as long as terminal 14 is participating in the conference call.

Software program 46 is preferably executed by terminals 14. However, it is appreciated that software program 46 may be executed, at least partially, by any other network device, such as p2p server 18, and/or conferencing server 19, and/or one or more of peer servers 20. It is appreciated that any network device that can measure the channel quality of terminals 14 may execute software program 46, at least partially. Alternatively, terminals 14 may monitor its channel quality while other elements of the software program 46 are executed by one or more other network devices.

Returning to FIG. 1, the combined-access teleconferencing-network 10 enables terminals 14 to migrate between conferencing topologies, and/or access a conference using any combination of access modes concurrently, where each access mode is using a different conferencing technology. Thus, a terminal 14 may communicate conferencing content with some other terminals 14 participating in the conference call using a conferencing server 19, communicate conferencing content with other terminals 14 participating in the conference call using its peer-server 20 and p2p communication, and communicate conferencing content with still other terminals 14 participating in the conference call using direct p2p communication, preferably using common coding schemes. It is appreciated that a terminal 14 may participate in more than one group of terminals using p2p communication and a common coding scheme. Preferably, each such group uses a different common coding scheme. Preferably whenever possible, terminals 14, peer-servers 20 and even conferencing server 19 use multicasting to transmit conferencing content, particularly when using a common coding scheme.

Each of the topologies has its advantages and disadvantages, which effects vary according to bandwidth availability and channel quality. In a mobile environment, bandwidth and channel quality may vary with time, thus affecting the considerations and preferences for selecting a conferencing technology. Such considerations and preferences may be different for different terminals at different time. Hence, it would be advantageous to provide means for migration between conferencing technologies and/or topologies. The present invention provides such migration means for the terminals participating in a conference, for a group of terminals forming a part of the terminals participating in the conference, and/or for a single terminal participating in the conference.

Typically, a conference starts with mobile terminals 14 communicating via their peer-servers 20 and via one or more conferencing server 19. The conference then preferably migrates to strict conferencing-server based topology (topology A) where the terminals by-pass their peer-servers 20 to reduce the latency (delay) typically added by the proxies.

Thereafter, groups of terminals 14 having the same bandwidth and/or channel quality can migrate to peer-server based topology, including only terminals and their peer-servers 20. Later on, terminals may migrate to pure p2p technology, by-passing their peer-servers 20 and communicating directly between themselves. Terminals 14 that migrated to peer-server based or to pure p2p technology and then experienced a decrease of their bandwidth or channel quality may then migrate back to the conferencing-server based topology (with or without using their peer-servers 20).

For example, N terminals are participating in a conference call. The N terminals are divided into two groups according to channel quality threshold such as bandwidth, bit-rate, or any other communication parameter or combination thereof. For example, terminals in group A enjoy a bandwidth higher than a threshold, while terminals of group B use bandwidths lower than the threshold. A terminal of group A may communicate directly with the other terminals of group A using a common bit-rate (higher than the threshold). However, the terminal of group A still need to communicate with terminals of group B using one or more other topologies.

In this mode of combined access, a terminal of group A preferably sends content (typically audio and/or video) in multicasting mode to terminals of group A and to the conferencing server 19. The conferencing server 19 then forwards the content to other terminals of group B. In the downstream direction the terminal receives content streams from terminals of group A and a combined stream from the conferencing server 19, all using the same bit-rate. Alternatively, the streams in either or both the upstream and downstream directions may be communicated via the peer-server 20 serving the terminal. In this alternative the proxy creates the display matrix and sends the combined stream to the terminal, thus reducing the load on the terminal's processing power.

It is appreciated that the combined-access teleconferencing-network 10 may include several such groups A, and thus also several such groups B. Consequently, terminal 14 may, at the same time, communicate as a member of more than one group A, and, in the same time, also communicate as a member of one or more groups B. It is appreciated that terminals 14 can migrate between such groups, automatically and/or continuously and/or repeatedly, according to changes in various aspects of their channel quality. Hence, groups of terminals using any type and combination of conference topologies and coding schemes are continuously and automatically created, joined, left and discarded. Thus, the combined-access teleconferencing-network 10 automatically and continuously optimizes the user experience when participating in the conference call.

As described above, terminals 14 measure their channel quality and then search for groups of terminals 14 that use a common coding scheme that is compatible with the measured channel quality. Alternatively, terminals 14 search for other terminal 14 having a similar channel quality and then establish a group of terminals 14 using a common coding scheme compatible with these similar channel qualities. Alternatively, at least one network device of the combined-access teleconferencing-network 10 creates and manages a database, or a map, of such available groups and/or terminal measurements of channel quality. In one mode of operation each terminal 14 manages its own database of groups and terminals. In another mode of operation a central network entity (optionally including one or more servers) manages this database for the terminals 14 participating in the conference call.

Figure 4:
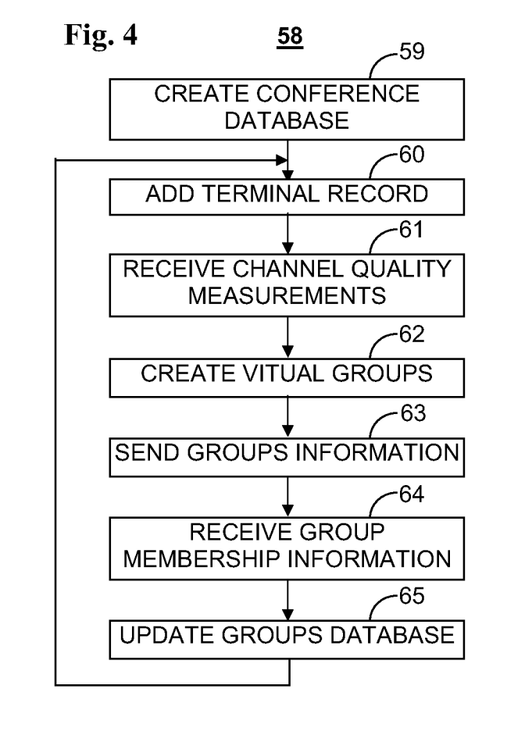
FIG. 4 is a simplified block diagram of a software program executed by a processor of a network server of the combined-access teleconferencing-network.

Reference is now made to FIG. 4, which is a simplified block diagram of a software program 58 executed by a processor of a network server according to a preferred embodiment of the present invention.

It is appreciated that the network server executing software program 58 may be any network device such as p2p server 18, and/or conferencing server 19, and/or one or more of peer servers 20, as well as any of terminals 14.

Software program 58 preferably receives from terminals 14 channel quality measurements, preferably, automatically and continuously and/or repeatedly. Software program 58 then maintains a database of these terminals 14 and their current channel quality measurements. Software program 58 then initiates groups of terminals 14 sharing the same or similar channel quality. Software program 58 then maintains a database of these groups, as well as memberships of terminals 14 in such groups. A database of terminals (with their channel quality measurements) and terminal groups (with their common coding schemes) is preferably maintained for each conference call.

Thus, as a variation of the operation of software program 46 as described with reference to FIG. 3, terminals 14 may interrogate software program 58 for optional groups compatible with their respective channel quality measurements.

Software program 46 preferably starts with step 59 by creating a database for a conference call, including a database of terminals and a database of groups.

Software program 46 preferably proceeds with step 60, identifying new terminals as they join the conference call and creating associated record for each terminal.

Software program 46 preferably proceeds to step 61 by collecting channel quality measurements from terminals 14. A channel quality measurement may include one or more communication parameters such as: available bandwidth, error rate, BER (bit error rate), packet error rate, packet loss, latency, packet latency, initial delay (delay to first returned packet), inter-packet delay (average delay between packets), maximum packet delay, median packet delay, packet delay for N standard deviations, quality of service, signal to noise ratio, interference, multipath, etc., or any other parameter that may affect the effective bit-rate available to terminal 14. Software program 46 preferably stores such parameters in the terminal's record.

Software program 46 preferably proceeds with step 62 to create optional groups of terminals 14 sharing the same or similar channel quality, potentially using a common coding scheme.

Software program 46 then preferably proceeds to step 63, sending group information to terminals 14. This may be done by first receiving an interrogation, or information request, for particular terminals and responding with group information relevant to the channel quality of the requesting terminal. Alternatively, software program 46 may initiate the creation of terminal groups by distributing relevant group information to selected groups of terminals. Such group information may include terminal identification (such as identifying name, nickname, alias, IP address, etc.) and their respective channel quality. Alternatively or additionally, software program 46 may send a list of terminals with a suggested common coding scheme compatible with their current measurements of channel quality. Alternatively or additionally, software program 46 may suggest an existing group of terminals using a common coding scheme compatible to the channel quality of the requesting terminal.

Software program 46 preferably proceeds to step 64, in which it receives group membership information from terminals 14. This group membership information includes identification of a group of terminals using a common coding scheme to which the current terminal is joining or leaving. Software program 46 preferably proceeds to step 65, in which it updates the groups database.

Steps 60 to 65 are preferably executed in a continuous loop.

It is expected that during the life of this patent many relevant methods and systems will be developed and the scope of the terms herein, particularly of the terms "communication technology", "wireless communication", "mobile terminal", "conferencing", "channel quality", "coding scheme" and "transcoding" are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for teleconferencing, the method comprising:
    measuring, by a first terminal from among a plurality of terminals participating in the teleconferencing, channel quality at the first terminal;
    joining, by the first terminal, a group of terminals from the plurality of terminals according to the channel quality measurement;
    selecting, by the first terminal, a first coding scheme adaptive to the channel quality measurements and shared by other terminals in the group of terminals;
    communicating, by the first terminal, conferencing content between the group of terminals via peer-to-peer communication and using the first coding scheme; and
    sending and receiving, by the first terminal concurrently with the peer-to-peer communication, the conferencing content between the first terminal and a second terminal from among the plurality of terminals that is outside of the group of terminals using the first coding scheme, the second terminal using a second coding scheme that is different from the first coding scheme, the sending and receiving being via at least one network device selected from a group consisting of:
    a conferencing-server and a peer-server, wherein the conferencing content is transcoded between the first coding scheme and the second coding scheme at the network device.

2. The method of claim 1, wherein the selected one from the conferencing-server and the peer-server communicates with the group of terminals including the first terminal as a peer device using peer-to-peer communication.

3. The method of claim 1, wherein the channel quality measurement comprises measuring at least one communication parameter comprising one or more of:
    available bandwidth, error rate, BER (bit error rate), packet error rate, packet loss, latency, packet latency, initial delay (delay to first returned packet), inter-packet delay (average delay between packets), maximum packet delay, median packet delay, packet delay for N standard deviations, quality of service, signal to noise ratio, interference, or multipath.

4. A method for participating in a teleconferencing call, the method comprising:
    interrogating, by a first terminal, for a group of terminals participating in the teleconferencing call and using a common coding scheme;
    communicating, by the first terminal, conferencing content with at least one terminal of the group of terminals via peer-to-peer communication using the common coding scheme; and
    sending and receiving, by the first terminal concurrently with the peer-to-peer communication, the conferencing content with a second terminal participating in the teleconferencing call outside of the group of terminals using the common coding scheme, the second terminal using a different coding scheme from the common coding scheme, the sending and receiving being via at least one network device selected from a group consisting of:
    a conferencing-server and a peer-server, wherein the conferencing content is transcoded between the common coding scheme and the different coding scheme at the network device.

5. The method of claim 4, wherein the selected one from the conferencing-server and the peer-server communicates with the group of terminals including the first terminal as a peer device using peer-to-peer communication.

6. A method for a teleconferencing call, comprising:
    interrogating, by a first terminal, for other terminals participating in the teleconferencing call for a parameter comprising a channel quality of each of the other terminals;
    managing, by the first terminal, a database of the parameters;
    managing, by the first terminal, a database of the other terminals using at least one coding scheme;
    suggesting, by the first terminal, a common coding scheme to a first subset of the other terminals that exhibits, in response to the interrogating, a common channel quality;
    communicating, by the first terminal using the common coding scheme, conferencing content among the first subset of the other terminals that adopt the suggested common coding scheme via peer-to-peer communication; and
    sending and receiving, by the first terminal using the common coding scheme, the conferencing content concurrently with a second terminal from among a second subset of the other terminals that utilizes a different coding scheme than the common coding scheme via at least one network device, wherein the conferencing content is transcoded between the common coding scheme and the different coding scheme at the at least one network device.

7. The method of claim 6, wherein the interrogation for the channel quality comprises measuring at least one communication parameter comprising one or more of:
    available bandwidth, error rate, BER (bit error rate), packet error rate, packet loss, latency, packet latency, initial delay (delay to first returned packet), inter-packet delay (average delay between packets), maximum packet delay, median packet delay, packet delay for N standard deviations, quality of service, signal to noise ratio, interference, or multipath.

8. A terminal device comprising:
    a communication module operative to enable the terminal device to communicate in a communication network;

a peer communication module operative to enable the terminal device to participate as a peer in a peer-to-peer network, the peer-to-peer network operating in the communication network;

a module for measuring channel quality of the terminal device in the communication network;

a module for selecting a first coding scheme and a second coding scheme adaptive to the channel quality;

a module for interrogating for a first group of terminal devices participating in a conferencing call and using a common coding scheme compatible with at least one of the first and second coding schemes;

a module for participating in the conference call with the first group of terminal devices to communicate conferencing content using the common coding scheme, and concurrently communicating the conferencing content with a second terminal device from among a second group using a different coding scheme than the common coding scheme, using at least two conferencing technologies selected from a group consisting of:

conferencing-server-based conferencing, peer-server-based conferencing where the peer-server represents the network device to the peer-to-peer network, the conferencing content being transcoded between the common coding scheme and the different coding scheme by the conferencing-server or peer-server, and peer-to-peer conferencing.

9. The terminal device of claim 8, wherein the module for participating in the conference call is operative to:

communicate the conferencing content directly with the first group using the common coding scheme via peer-to-peer conferencing using the selected coding scheme; and communicate concurrently the conferencing content with the second terminal device among the second group using one or more other conferencing technologies and the common coding scheme.

10. The terminal device of claim 9, wherein the communicating conferencing content with the second terminal comprises communicating the conferencing content via at least one network device selected from a group consisting of:

a conferencing-server and a peer-server.

11. The terminal device of claim 8, wherein the measuring channel quality comprises measuring at least one communication parameter comprising one or more of:

available bandwidth, error rate, BER (bit error rate), packet error rate, packet loss, latency, packet latency, initial delay (delay to first returned packet), inter-packet delay (average delay between packets), maximum packet delay, median packet delay, packet delay for N standard deviations, quality of service, signal to noise ratio, interference, or multipath.

12. A computer program product, stored on a non-transitory computer-readable medium, comprising instructions operative to cause a programmable processor of a terminal device to perform a teleconferencing process comprising:

measuring channel quality for the terminal device from among a plurality of terminal devices participating in the teleconferencing;

joining a group of terminal devices from the plurality of terminal devices, according to the channel quality measurement;

selecting a first coding scheme adaptive to the channel quality measurements and shared by other terminal devices in the group of terminal devices;

communicating conferencing content between the group of terminal devices via peer-to-peer communication and using the first coding scheme; and sending and receiving, concurrently with the peer-to-peer communication, the conferencing content between the terminal device and a different terminal device from among said plurality of terminal devices that is outside of the group of terminal devices using the first coding scheme, the different terminal device using a second coding scheme that is different from the first coding scheme, the sending and receiving being via at least one network device selected from a group consisting of:

a conferencing-server and a peer-server, wherein the conferencing content is transcoded between the first coding scheme and the second coding scheme at the network device.

13. A computer program product, stored on a non-transitory computer-readable medium, comprising instructions operative to cause a programmable processor of a terminal device to perform a teleconferencing process comprising:

interrogating for a group of terminal devices participating in the teleconferencing process and using a common coding scheme;

communicating conferencing content with at least one terminal of the group of terminal devices via peer-to-peer communication using the common coding scheme; and sending and receiving, concurrently with the peer-to-peer communication, the conferencing content with a different terminal device participating in the teleconferencing process outside of the group of terminal devices using the common coding scheme, the different terminal device using a different coding scheme from the common coding scheme, the sending and receiving being via at least one network device selected from a group consisting of:

a conferencing-server and a peer-server, wherein the conferencing content is transcoded between the common coding scheme and the different coding scheme at the network device.

14. A computer program product, stored on a non-transitory computer-readable medium, comprising instructions operative to cause a programmable processor of a terminal device to perform a teleconferencing process comprising:

interrogating for other terminal devices participating in the teleconferencing process for a parameter comprising a channel quality of each of the other terminal devices;

managing a database of the parameters;

managing a database of the other terminal devices using at least one coding scheme;

suggesting a common coding scheme to a first subset of the other terminal devices that exhibits, in response to the interrogating, a common channel quality;

communicating, using the common coding scheme, conferencing content among the first subset of the other terminal devices that adopt the suggested common coding scheme via peer-to-peer communication; and sending and receiving, using the common coding scheme, the conferencing content concurrently with a different terminal device from among a second subset of the other terminal devices that utilizes a different coding scheme than the common coding scheme via at least one network device, wherein the conferencing content is transcoded between the common coding scheme and the different coding scheme at the at least one network device.

15. The method of claim 4, further comprising:
selecting, by the first terminal in response to a change in the channel quality measurements, a second coding scheme that is different from the common coding scheme;
leaving, by the first terminal, the group of terminals in response to the change; and
joining, by the first terminal, a second group of terminals, wherein the second group of terminals communicates the conferencing content via the peer-to-peer communication using the second coding scheme.

16. The method of claim 15, further comprising:
sending and receiving, after the leaving, the conferencing content with the group of terminals via the at least one network device concurrently with communicating the conferencing content with a third terminal of the second group of terminals via the peer-to-peer communication, wherein the transcoding is between the second coding scheme and the common coding scheme.

17. The method of claim 4, wherein the second terminal participates in the teleconferencing as part of a second group of terminals using the different coding scheme that is based on different channel quality measurements for the second group of terminals.

18. The method of claim 6, further comprising:
receiving the conferencing content from the at least one network device after the at least one network device transcodes the conferencing content from the different coding scheme to the common coding scheme.

19. The method of claim 1, wherein the communicating comprises the first terminal communicating with a third terminal from among the group of terminals via the peer-to-peer communication.

\* \* \* \* \*